United States Patent
Song et al.

(10) Patent No.: US 9,565,909 B2
(45) Date of Patent: Feb. 14, 2017

(54) DEVICE SUPPORT STAND ASSEMBLY

(71) Applicant: HEWLETT-PACKARD DEVELOPMENT COMPANY, L.P., Houston, TX (US)

(72) Inventors: Ki Bok Song, Houston, TX (US); Eric Chen, Houston, TX (US); Ilchan Lee, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 14/892,020

(22) PCT Filed: Jun. 28, 2013

(86) PCT No.: PCT/US2013/048494
§ 371 (c)(1),
(2) Date: Nov. 18, 2015

(87) PCT Pub. No.: WO2014/209343
PCT Pub. Date: Dec. 31, 2014

(65) Prior Publication Data
US 2016/0106190 A1  Apr. 21, 2016

(51) Int. Cl.
*G06F 1/16* (2006.01)
*A45C 11/00* (2006.01)
*F16M 11/04* (2006.01)
*F16M 11/20* (2006.01)

(52) U.S. Cl.
CPC ............ *A45C 11/00* (2013.01); *F16M 11/041* (2013.01); *F16M 11/2021* (2013.01); *G06F 1/166* (2013.01); *G06F 1/1626* (2013.01); *G06F 1/1637* (2013.01); *A45C 2011/003* (2013.01); *A45C 2200/15* (2013.01)

(58) Field of Classification Search
CPC ...................................................... G06F 1/166
See application file for complete search history.

(56) References Cited

U.S. PATENT DOCUMENTS

| | | | | |
|---|---|---|---|---|
| 6,695,273 | B2 * | 2/2004 | Iguchi | F16M 11/00 248/351 |
| 8,891,232 | B2 * | 11/2014 | Wang | G06F 1/1637 248/121 |
| 8,960,630 | B2 * | 2/2015 | Fu | F16M 11/10 248/371 |
| 2003/0057343 | A1 * | 3/2003 | Jacobs | A47B 23/04 248/441.1 |

(Continued)

OTHER PUBLICATIONS

"Magnet Stand Folio Case"; Griffin Technology; http://store.griffintechnology.com/magnet-stand-folio-case; 2 pages.

(Continued)

*Primary Examiner* — Anthony Q Edwards
(74) *Attorney, Agent, or Firm* — HP Patent Department

(57) ABSTRACT

Implementations of the present disclosure disclose a device support stand assembly. According to one implementation, the assembly includes a removable support stand member having an attachment feature for coupling to a corresponding mating element formed on a rear side of a portable electronic device. In addition, the support stand member includes a tension spring configured for dual operating positions with respect to the portable electronic device.

16 Claims, 5 Drawing Sheets

(56) References Cited

U.S. PATENT DOCUMENTS

| | | | |
|---|---|---|---|
| 2007/0075208 A1 | 4/2007 | Chen | |
| 2007/0235617 A1* | 10/2007 | Yukawa | G06F 1/16 248/371 |
| 2010/0243850 A1 | 9/2010 | Derry | |
| 2011/0036965 A1* | 2/2011 | Zhang | F16M 11/10 248/688 |
| 2011/0170252 A1 | 7/2011 | Jones et al. | |
| 2012/0188693 A1* | 7/2012 | Chiang | F16M 11/10 361/679.01 |
| 2012/0252543 A1 | 10/2012 | Cho | |
| 2012/0325702 A1 | 12/2012 | Gallaghe et al. | |
| 2013/0020215 A1 | 1/2013 | Hsu | |
| 2013/0092811 A1 | 4/2013 | Funk et al. | |
| 2013/0109253 A1 | 5/2013 | Gammon et al. | |
| 2013/0163197 A1 | 6/2013 | Mack et al. | |
| 2015/0092346 A1* | 4/2015 | Ben | G06F 1/166 361/679.55 |
| 2016/0127001 A1* | 5/2016 | Mehandjiysky | A45C 11/00 455/575.8 |

OTHER PUBLICATIONS

Qin, M.; "For Samsung Galaxy S3 I9300 Spring Kickstand Case"; Smart Piastics Trading Firm Huazhou Pingding; 3 pages.
Rice, J.; "Samsung Galaxy Note 8.0 Book Cover Review: Very Nice and Too Expensive, Just Like the Tablet Inside"; Apr. 30, 2013; 9 pages.
Taylor, A.; "Archos 101 XS 10.1in Android Tablet Review"; Sep. 11, 2012; 3 pages.
TVC-Mall; Slim Magnetic Hard Smart Cover with Stand for New iPad 2nd 3rd 4th Generation—6 pages.

\* cited by examiner

DEVICE SUPPORT STAND ASSEMBLY

BACKGROUND

The emergence and popularity of mobile computing has made portable electronic devices—due to their compact design and light weight—a staple in today's marketplace. Mobile devices such as tablet personal computers and smartphones involve advance computing functionality and are utilized for multiples tasks such as email, internet surfing, gaming, and media capture/playback. During these times, user's often place their device on a normal operating surface for easier operation or viewing.

BRIEF DESCRIPTION OF THE DRAWINGS

The features and advantages of the present disclosure as well as additional features and advantages thereof will be more clearly understood hereinafter as a result of a detailed description of implementations when taken in conjunction with the following drawings in which.

DETAILED DESCRIPTION OF THE INVENTION

Figure 1A:
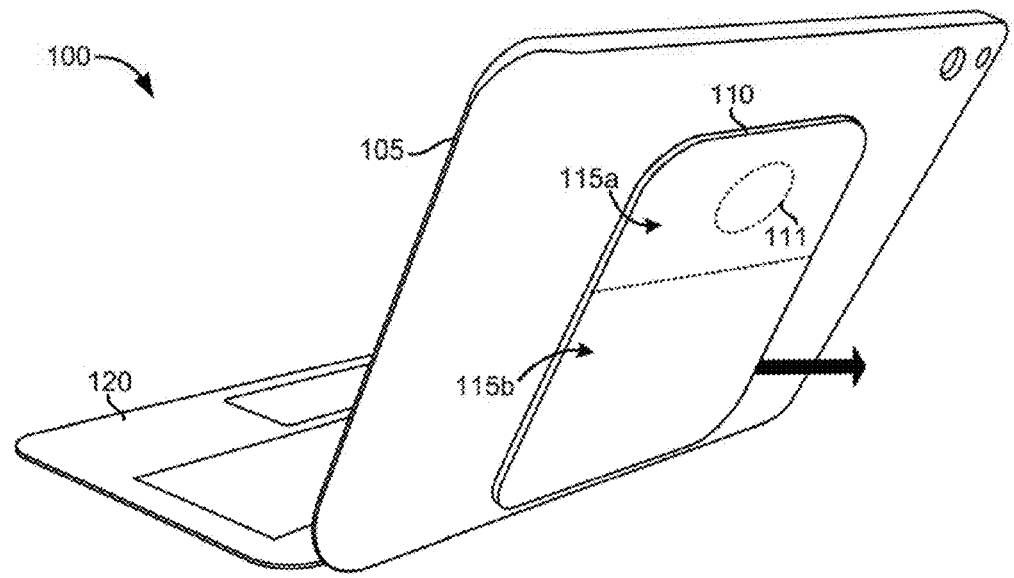
FIGS. 1A and 1B are a three-dimensional perspective views of a device support stand assembly according to an example implementation.

The following discussion is directed to various examples. Although one or more of these examples may be discussed in detail, the implementations disclosed should not be interpreted, or otherwise used, as limiting the scope of the disclosure, including the claims. In addition, one skilled in the art will understand that the following description has broad application, and the discussion of any implementations is meant only to be an example of one implementation, and not intended to intimate that the scope of the disclosure, including the claims, is limited to that implementation. Furthermore, as used herein, the designators "A", "B" and "N" particularly with respect to the reference numerals in the drawings, indicate that a number of the particular feature so designated can be included with examples of the present disclosure. The designators can represent the same or different numbers of the particular features.

The figures herein follow a numbering convention in which the first digit or digits correspond to the drawing figure number and the remaining digits identify an element or component in the drawing. Similar elements or components between different figures may be identified by the user of similar digits. For example, 143 may reference element "43" in FIG. 1, and a similar element may be referenced 243 in FIG. 2. Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense Today, some portable electronic devices include built-in mechanical hinges for providing standing support for the portable device. These built-in stands typically only support one viewing position, however, and extended operation (e.g., word processing) and viewing of content (e.g., movie playback) on mobile device often times require adjustment of the user's viewing position or that of the mobile device. Furthermore, users of tablets and similar portable devices demand a thin profile and light weight to allow for a more appealing form factor and to enhance usability. As such, many manufacturers are electing not to include a built-in stand feature in order to reduce the mechanical components and overall weight and size of the tablet device. To this end, other solutions involve inclusion of a mobile device protective sleeve, cover, or carrying case having a built-in "kickstand" for providing standing support functionality. However, most of these device casings are not easily removable from the device; unable to provide a platform for presenting the associated display at multiple viewing angles and orientations; and also undesirably add to the overall thickness and weight of the tablet device.

Examples of the present disclosure describe device support stand assembly. According to one implementation, a portable electronic device is magnetically coupled to a removable "kickstand" support member on a back surface area thereof. Moreover, the removable support member includes a tension spring for enabling multiple operating states (e.g., closed and bent) and viewing angles/orientations of an attached portable electronic device with respect to the operating surface. As such, the assembly described herein provides a robust solution for device standing support functionality while maintaining minimal thickness and an aesthetically-pleasing appearance.

Figure 1B:
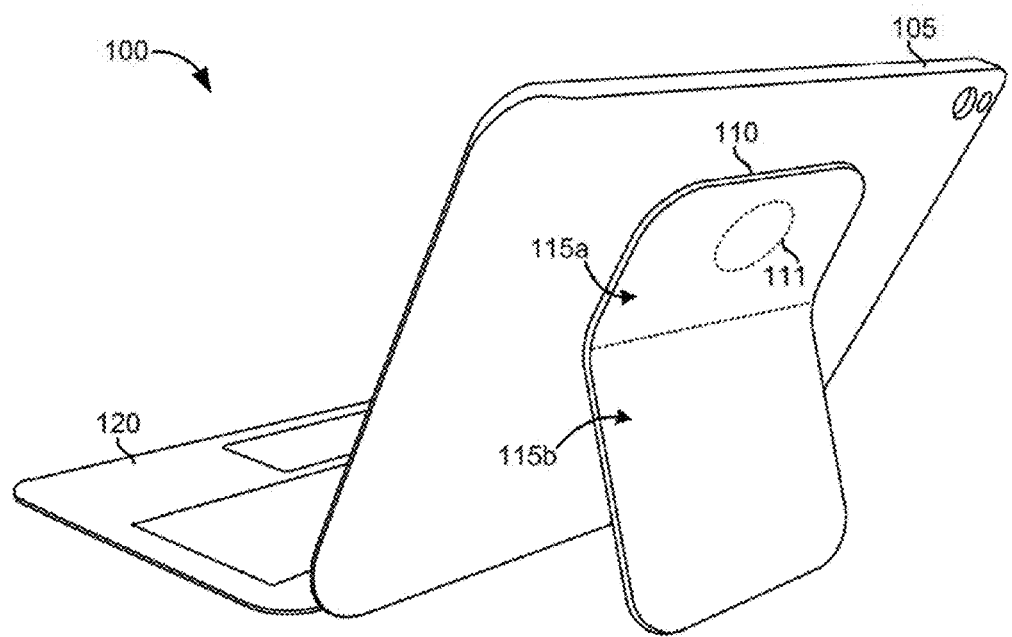

Referring now in more detail to the drawings in which like numerals identify corresponding parts throughout the views, FIGS. 1A and 1B are a three-dimensional perspective views of a device support stand assembly according to an example implementation. As shown here, the removable support stand assembly 100 includes a portable electronic device 105, a keyboard 120, and a removable support stand member 110. In one example, the support stand member 110 can be formed of one complete piece (i.e., all necessary parts captured inside of exterior housing) while providing for movement from a closed or resting position (FIG. 1A) to a bent or stand position (FIG. 1B). More particularly, the removable support stand member 110 can be easily attached/detached to and from the back surface of the portable electronic device 105 using magnets (e.g. 111) or a similar coupling mechanism (e.g., hook and loop fastener, adhesive, etc.).

In implementations described herein, the support stand member 110 includes an attachment area 115a and a moveable area 115b. As shown in FIG. 1B, when in the bent/support position, the moveable area 115b extends away from the back surface of the portable electronic device 105 while the attachment area 115a remains fixed onto the back surface of the portable electronic device 105. According to one implementation, the support stand member 110 is sufficiently compact and thin, and only occupies a small area (e.g., one-third of the surface area) of the rear side of the portable electronic device 105.

Figure 2:
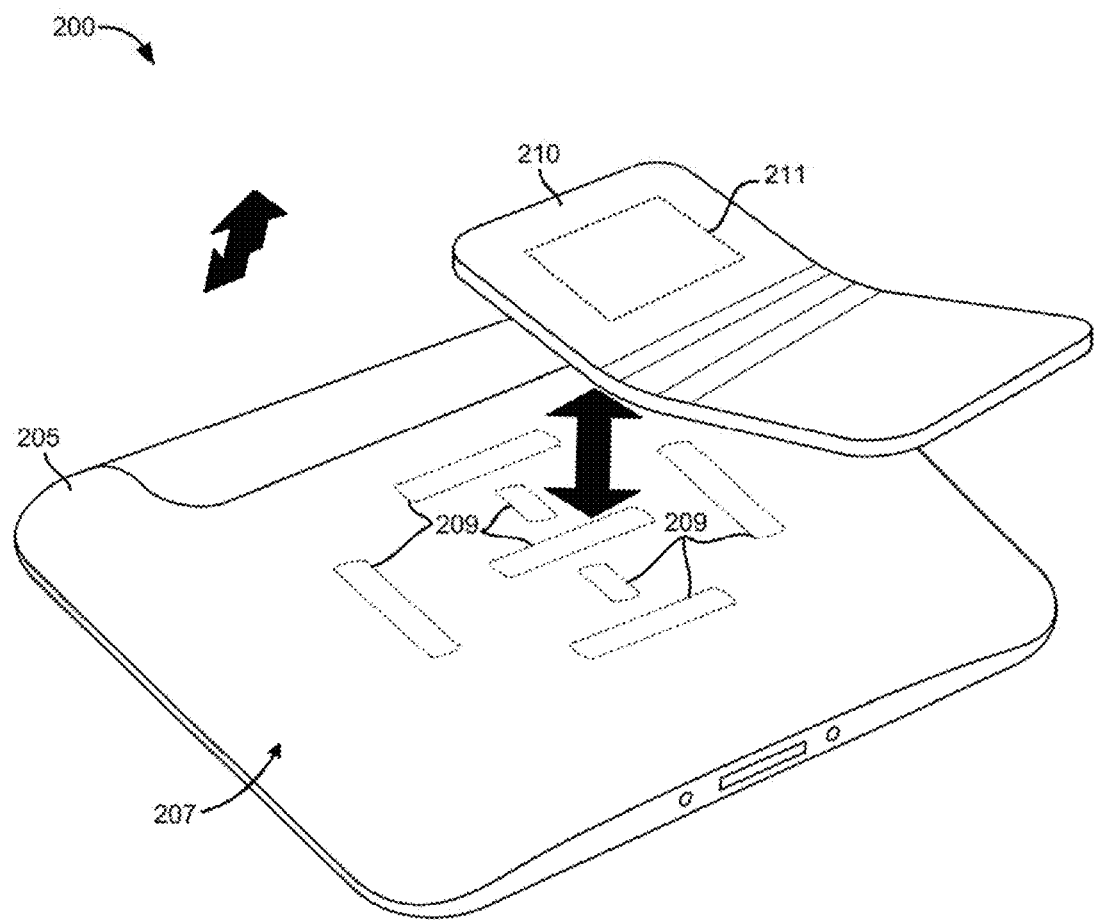
FIG. 2 is a three-dimensional perspective view of a support stand member and portable electronic device according to an example implementation.

FIG. 2 is a three-dimensional perspective view of a support stand member and portable electronic device according to an example implementation. As shown here, the tablet computer 205 is face down such that the rear surface side 207 is facing upwards. In addition, the tablet computer 205 includes an internal attachment element 209 that can be formed along multiple positions along the back surface side 207 thereof. Moreover, a removable support stand 210 is configured to attach to the rear surface of the tablet device 205 via a corresponding attachment element 211 formed near joining end of the support stand 210.

In one implementation, the mating element 209 of the tablet device 205 represents a corresponding magnetic element material or plurality of magnet elements 209 formed within or along the outer casing of the tablet device 200. For example, attachment feature 209 may comprise of a magnet or plurality of magnets, or magnetic material that is attracted to or corresponds with a magnet (e.g., outer casing formed or metal, steel, etc.). More particularly, the mating element 209 represents an attachment feature that corresponds with the attachment element 211 associated with the support stand 210. Moreover, the configuration of the present disclosure enables the support stand 210 to be placed in multiple positions along the back surface 207 of the tablet device 205 so as to allow for multiple stand positions and orientations of the tablet device 205 when placed on an operating surface as will be described in further detail below.

Figure 3:
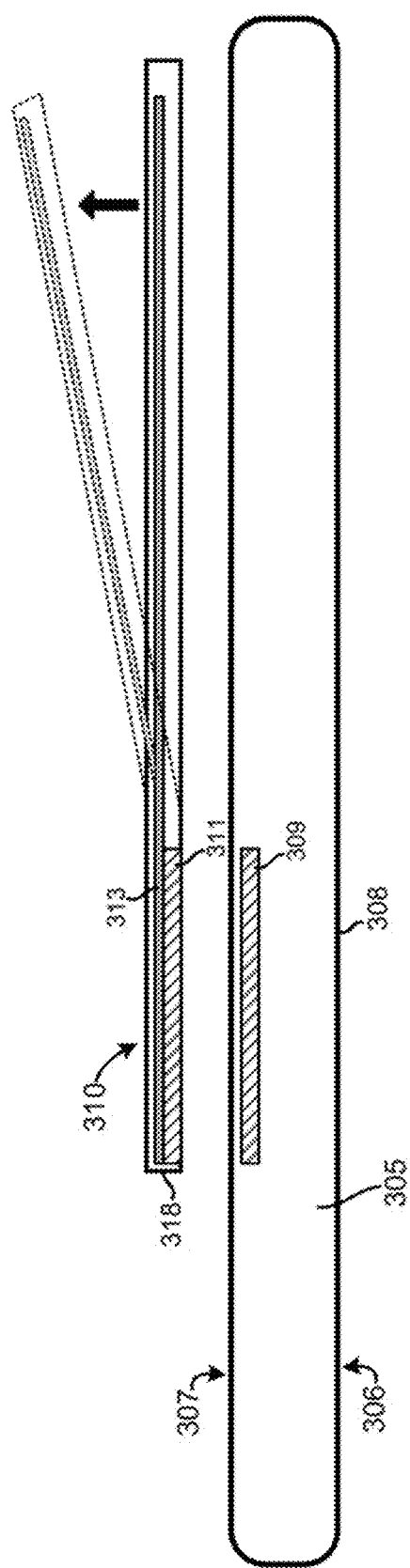
FIG. 3 is a side profile view of a device support stand assembly according to an example implementation.

FIG. 3 is a side profile view of a device support stand assembly according to an example implementation. As described above, the portable electronic device 305 includes an outer casing 388 and an attachment element (e.g., magnet) 309 formed within the casing 308. More particularly, the attachment element 309 is formed near a rear surface side 307 (i.e., side opposite the display surface 306) of the portable electronic device 305. In addition, the support stand member 310 includes an attachment element 311 and a thin tension spring 313 formed within the support stand member 310 and completely covered by an exterior housing 318. In some implementations, the exterior housing 318 represents fabric, rubber, or similar flexible material capable of providing sufficient standing support when the support stand member 310 is in the bent position. According to one example, the attachment element 311 is a magnet for enabling magnetic coupling with a corresponding magnet 309 formed within the portable electronic device 305.

Tension spring 313 represents an adjustable and elastic spring designed to operate with a tension load and stretch as the load is applied. In some implementations, the tension spring 313 is configured to provide at least two pre-fixed positions: a closed state in which the entire support stand member 310 lies flat and immediately adjacent to the rear surface 307 of the portable electronic device 305 (for compact mobility); and a bent state (as indicated by dotted line) in which the non-joined area of the support member is positioned away from the rear surface 307 of the portable electronic device 310 (for enabling stand support of the portable electronic device). As indicated by directional arrow and dotted lines, an operating user can manually adjust the support member 310 and tension spring 313 by simply pulling and disengaging the lower portion of the support member 310 away from the rear surface of the device 305. Accordingly, the support stand member 310 provides a removable and simple "kick stand" function for an attached portable electronic device 305.

Figure 4A:
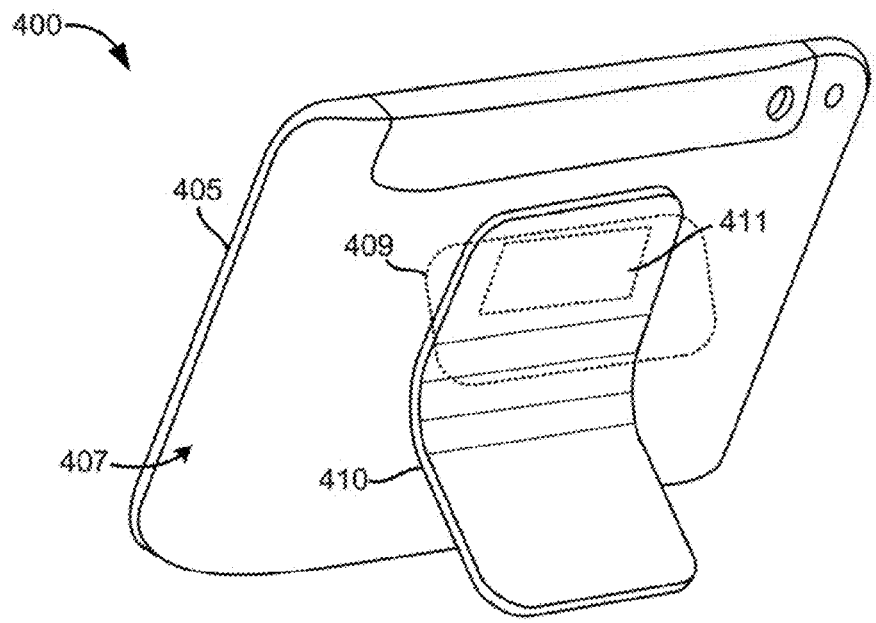
FIGS. 4A and 4B are three-dimensional perspective views of the device support stand assembly in different viewing orientations according to an example implementation.
Figure 4B:
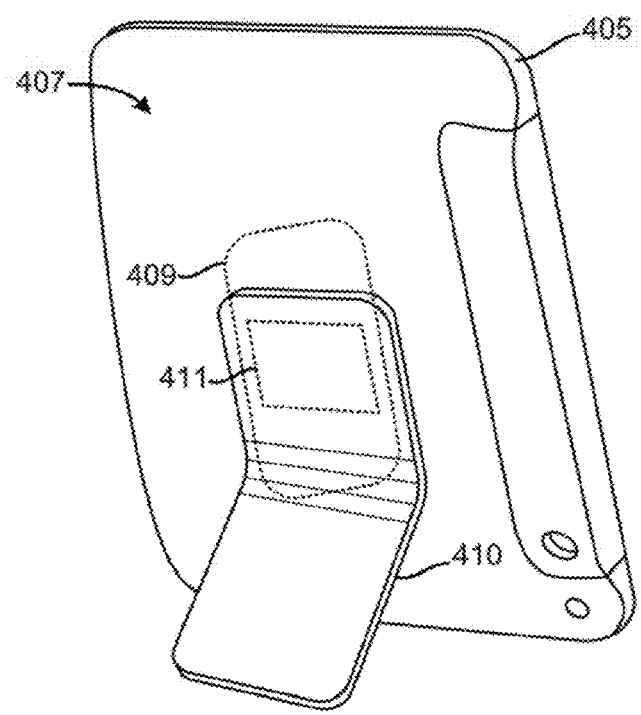

FIGS. 4A and 4B are three-dimensional perspective views of the device support stand assembly in different viewing orientations according to an example implementation. In the present disclosure, the attachment features 409 and 411 allow for multiple attachment points between the portable electronic device 405 and the support stand member 410. For example, FIG. 4A depicts the support stand assembly 400 in a horizontal stand position in which the tablet device 405 is optimized for landscape viewing orientation. As shown here, the attachment feature or magnet 411 of the support stand member 410 is coupled with the attachment feature or magnetic element 409 of the portable electronic device 405. Moreover, the lower side area (side opposite position of attachment feature 411) is in a bent or "kickstand" position such that a portion of the support stand member 410 extends away from the rear surface of the portable electronic device 405.

Furthermore, FIG. 4B depicts the support stand assembly 400 in a vertical stand position in which the tablet device 405 is optimized for portrait viewing orientation. As in the previous example, the attachment feature or magnet 411 of the support stand member 405 is again coupled with the attachment feature or magnet 409 of the portable electronic device 405, while the lower side area (side opposite position of attachment feature 411) is in a bent or "kickstand" position such that a portion of the support stand member 410 is extended away from the rear surface 407 of the portable electronic device 405. Since the support stand member 410 is easily removed from the rear surface of the device 405, it may be quickly repositioned and reoriented at the user discretion to provide the optimum viewing orientation for the portable electronic device 406. For example, while an operating user watches a video or slide show on a display of the tablet device while in the horizontal stand position (i.e., landscape viewing orientation as shown in FIG. 4A), the user may receive a text message containing a link to a webpage and then quickly readjust the support stand member 410 (e.g., turn clockwise ninety degrees) for optimal viewing of the webpage in the vertical stand position (i.e., portrait viewing orientation as shown in FIG. 4B).

Figure 5A:
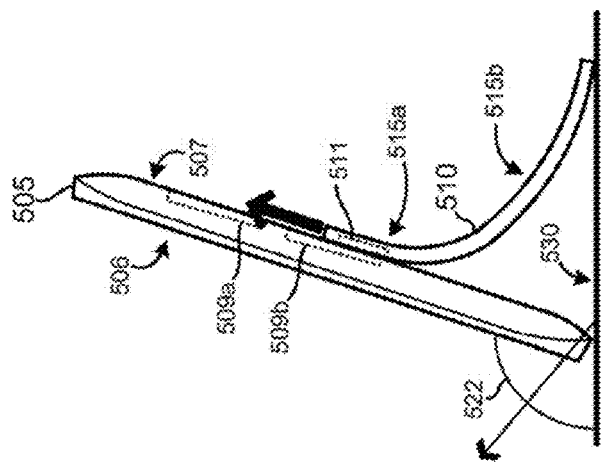
FIGS. 5A-5C are illustrations of the device support stand assembly adjusted for multiple display viewing angles according to an example implementation.
Figure 5B:
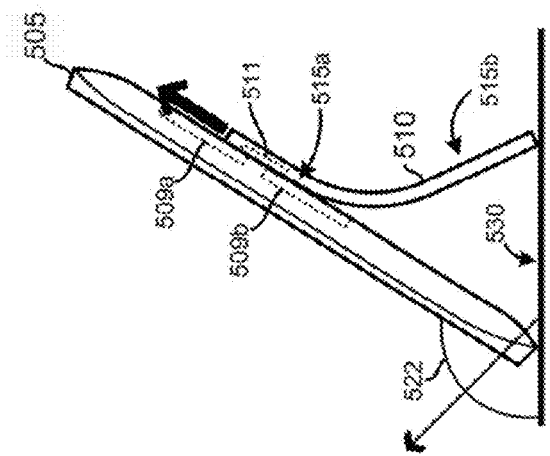
Figure 5C:
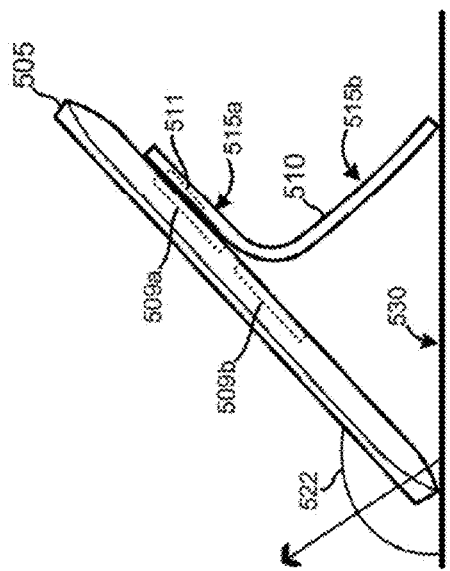

FIGS. 5A-5C are illustrations of the device support stand assembly adjusted for multiple display viewing angles according to an example implementation. FIG. 5A depicts the tablet device 505 in a slightly inclined angle based on the attachment position of the support stand member 510. In this example implementation, the portable electronic device includes two attachment features 509a and 509b (though these may be combined for one large attachment feature). Moreover, support stand member 510 may be removably attached (i.e., capable of effortless attachment and detachment) to the rear surface 507 of the tablet device 505 via magnetically coupling of magnet 511 with either or both magnets 509a and 509b. As shown in FIG. 5A, the support stand magnet 511 is positioned in a centrally lower area on the rear surface side 507 of the device 505 and coupled only with attachment feature 509b. Furthermore, when the support stand member is in the bent or stand operating state, a connection area 515a of the stand member 510 remains joined with the rear surface 507 of the tablet device 505, while a lower area 515b extends away from the rear surface 507 and contacts the operating surface 530 so as to counterbalance the weight of the tablet device and maintain the device 505 in a substantially upright position.

Moreover, and as shown in FIGS. 5B and 5C, as the support stand member 510 is moved further up the rear surface 507 of the tablet device 505, the viewing angle 522 of the tablet display surface 506 becomes larger. For example, FIG. 5B depicts the connection area 515a positioned near a central rear area of the tablet device (higher position than FIG. 5A) such that the support stand magnet 511 is joined with both attachment features 509a and 509b associated with tablet device 505. As in the previous example, when the support stand member 510 is in the depicted bent or stand operating mode, the connection area 515a of the stand member 510 remains joined with the rear surface 507 of the tablet device 505 while the lower area 515b extends away from the rear surface 507 and contacts a normal operating surface 530. Due to the higher positioning of the support stand member 510 along the rear surface 507, the display viewing angle 522 of the tablet device 505 is larger in FIG. 5B than FIG. 5A. In accordance with implementations described herein, the viewing angle may be adjusted even further by repositioning the connection area 515a of the support stand member 510 further away from the operating surface 530 as shown in FIG. 5C. Here, the support stand member 510 is positioned even higher than that shown in FIG. 5B such that the support stand magnet 511 is coupled only with attachment feature 509a of the tablet device 505. Accordingly, FIG. 5C the display angle 522 of the tablet device 505 with respect to the normal operating surface 530 exceeds ninety degrees and allows for a more inclined viewing position.

Implementations of the present disclosure provide a device support stand assembly. Moreover, many advantages are afforded by the by the assembly in accordance with implementations described herein. For instance, the support stand member is significantly thinner and lighter than prior solutions and thus doesn't unduly impact the thickness and overall form factor of the tablet device. Additionally, the support stand member may be formed to complement the look of the attached tablet device so as to provide an aesthetically-pleasing appearance to the overall design and assembly. Still further, the tension spring within the support member provides a robust "kickstand" feature and allows for seamless transition between operating and viewing modes.

Furthermore, while the disclosure has been described with respect to particular examples, one skilled in the art will recognize that numerous modifications are possible. For instance, although examples described herein depict a tablet computer as the portable electronic device, the disclosure is not limited thereto. For example, the portable electronic device may be a convertible laptop computer, smartphone, monitor, or any other electronic device having a display conducive to standing support.

Moreover, not all components, features, structures, characteristics, etc. described and illustrated herein need be included in a particular example or implementation. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some examples have been described in reference to particular implementations, other implementations are possible according to some examples. Additionally, the arrangement o order of elements or other features illustrated in the drawings or described herein need not be arranged in the particular way illustrated and described. Many other arrangements are possible according to some examples.

The techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the techniques.

What is claimed is:

1. A device support stand assembly comprising:
a removable support stand member having an attachment feature for coupling to a corresponding mating element formed on a rear side of a portable electronic device, wherein the support stand member provides standing support for the portable electronic device in a horizontal stand position and a vertical stand position and includes a tension spring configured for dual operating positions with respect to the portable electronic device.

2. The assembly of claim 1, wherein the dual operating positions includes a closed position and a bent position.

3. The assembly of claim 2, wherein when in the closed position a moveable area is positioned immediately adjacent to the rear side of the portable electronic device, and
wherein when in the bent position the support stand member provides standing support for the portable electronic device.

4. The assembly of claim 2, wherein the removable support stand member includes a connection area and a bendable area, and
wherein when in the bent state, the connection area remains attached to the rear side of the portable electronic device while the bendable area disengages and extends away from the rear side of the portable electronic device.

5. The assembly of claim 1, further comprising:
wherein the removable support stand includes a magnet formed adjacent to the tension spring for enabling magnetic coupling with the mating feature of the portable electronic device.

6. The assembly of claim 5, wherein the mating feature of the portable electronic device comprises of one or more magnets for enabling magnetic coupling of the portable electronic device with the magnet of the support stand member.

7. The assembly of claim 1, wherein a surface area of the removable support stand member is substantially smaller than a surface area of the rear side of the portable electronic device.

8. The assembly of claim 1, wherein a viewing angle and orientation of the portable electronic device can be adjusted based on the attachment position of the support stand member to the rear side of the portable electronic device.

9. A removable support stand assembly including a tablet device, the assembly comprising:
a flexible housing;
a first attachment feature formed near a back surface of the tablet device;
a second attachment feature formed within the flexible housing and configured to engage with the first attachment feature associated with the tablet device and provide standing support for the tablet device in a horizontal stand position and a vertical stand position, and
an adjustable tension spring formed adjacent to the second attachment feature for enabling dual operating states with respect to an attached tablet device.

10. The assembly of claim 9, wherein the dual operating states includes a closed state in which the flexible housing is retracted against the back surface of the tablet device and a bent state in which the flexible housing and tension spring provides standing support for the tablet device.

11. The assembly of claim 10, wherein the removable support stand assembly includes a connection area and bendable area, and wherein when in the bent state, the connection area remains attached to the back surface of the tablet device while the bendable area disengages and extends away from the back surface of the tablet device.

12. The assembly of claim 9, wherein the first attachment feature and the second attachment feature comprise of magnets for enabling magnetic coupling of the tablet device with the flexible housing.

13. The assembly of claim 9, wherein a surface area of the flexible housing is substantially smaller than the surface area of the back surface of the tablet device.

14. A device support stand assembly comprising:
 a tablet casing including a first magnet formed on a rear surface; and
 a removable support stand member including a second magnet formed with a flexible housing for magnetic coupling with the tablet casing and a tension spring for enabling both a closed operating state and a standing operating state,
 wherein when in the closed operating state the removable support stand member lies flush against the tablet casing, and
 wherein when in the bent state, a connection area of the support stand member remains attached to the rear surface of the tablet casing while a bendable area disengages and extends away from the rear surface so as to provide standing support for the tablet casing, in a horizontal stand position and a vertical stand position, against an operating surface.

15. The assembly of claim 14, wherein a surface area of the flexible housing is substantially smaller than the surface area of the back surface of the tablet device.

16. The assembly of claim 14, wherein the second magnet of the support stand member is removable from the first magnet of the rear surface, the support stand is adjustable when the second magnet is removed from the first magnet, and the second magnet provides standing support for the tablet casing in the horizontal stand position or the vertical stand position when the second magnet is attached to the first magnet.

* * * * *